United States Patent
Rakshit (10) Patent No.: US 9,069,773 B2
(45) Date of Patent: *Jun. 30, 2015

(54) MULTIMEDIA DATA DELIVERY (75) Inventor: Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 319 days.

This patent is subject to a terminal disclaimer.

(21) Appl. No.: 13/602,461

(22) Filed: Sep. 4, 2012

(65) Prior Publication Data

US 2012/0331017 A1 Dec. 27, 2012

Related U.S. Application Data

(63) Continuation of application No. 12/891,980, filed on Sep. 28, 2010, now Pat. No. 8,346,827.

(51) Int. Cl.
*G06F 7/00* (2006.01)
*G06F 17/00* (2006.01)
*G06F 17/30* (2006.01)

(52) U.S. Cl.
CPC .............................. *G06F 17/30056* (2013.01)

(58) Field of Classification Search
CPC ................................................ G06F 17/30056
See application file for complete search history.

(56) References Cited

U.S. PATENT DOCUMENTS

| 7,023,979 | B1 * | 4/2006 | Wu et al. | 379/265.11 |
| 7,349,689 | B2 | 3/2008 | Chandley | |
| 7,974,714 | B2 * | 7/2011 | Hoffberg | 700/94 |
| 8,023,929 | B2 * | 9/2011 | Mgrdechian et al. | 455/414.1 |
| 2002/0124252 | A1 | 9/2002 | Schaefer et al. | |
| 2004/0199631 | A1 * | 10/2004 | Natsume et al. | 709/225 |
| 2007/0061838 | A1 | 3/2007 | Grubbs et al. | |
| 2008/0270163 | A1 * | 10/2008 | Green | 705/1 |
| 2009/0063279 | A1 | 3/2009 | Ives et al. | |
| 2009/0064219 | A1 | 3/2009 | Minor | |
| 2009/0327193 | A1 * | 12/2009 | Eronen et al. | 706/47 |
| 2010/0070996 | A1 | 3/2010 | Liao et al. | |
| 2012/0078983 | A1 | 3/2012 | Rakshit | |

FOREIGN PATENT DOCUMENTS

| CN | 20091130564 | 9/2009 |
| JP | 20060320772 | 6/2008 |

OTHER PUBLICATIONS

Huang et al., Use of Content Tags in Managing Advertisements for Online Videos, 1530-1354/08 copyright 2008 IEEE, DOI 10.1109/CEC/EEE.2008.10, pp. 249-254.
Office Action (Mail Date Apr. 23, 2012) for U.S. Appl. No. 12/891,980, filed Sep. 28, 2010; Confirmation No. 1415.
Amendment filed Jun. 26, 2012 in response to Office Action (Mail Date Apr. 23, 2012) for U.S. Appl. No. 12/891,980, filed Sep. 28, 2010; Confirmation No. 1415.
Notice of Allowance (Mail Date Aug. 24, 2012) for U.S. Appl. No. 12/891,980, filed Sep. 28, 2010; Confirmation No. 1415.

* cited by examiner

*Primary Examiner* — Susan Chen
(74) *Attorney, Agent, or Firm* — Schmeiser, Olsen & Watts; John Pivnichny (57) ABSTRACT

An information delivery method and system. The method includes receiving by a computer processor a video file, an audio file, associated data files, and associated message files The computer processor stores the video file in a first layer of a multimedia file, the audio file in a second layer of the multimedia file, the data files in first additional layers of the multimedia file, and the message files in second additional layers of the multimedia file. The computer processor stores the multimedia file on a computer readable storage medium.

19 Claims, 6 Drawing Sheets

MULTIMEDIA DATA DELIVERY

This application is a continuation application claiming priority to Ser. No. 12/891,980, filed Sep. 28, 2010, now U.S. Pat. No. 8,346,827 issued Jan. 1, 2013.

FIELD

The present invention relates to a method and associated system for delivering data from audio/video files.

BACKGROUND

Sharing information typically comprises an inefficient process with little flexibility. Accordingly, there exists a need in the art to overcome the deficiencies and limitations described herein above.

SUMMARY

The present invention provides a method comprising: receiving, by a computer processor of a computing system, a first video file and a first audio file associated with the first video file; receiving, by the computer processor, data files associated with the first audio file and the first video file; receiving, by the computer processor, message files associated with the data files; storing, by the computer processor, the first video file in a first layer of a multimedia file, the first audio file in a second layer of the multimedia file, the data files in first additional layers of the multimedia file, and the message files in second additional layers of the multimedia file; and storing, by the computer processor on a computer readable storage medium, the multimedia file comprising the first video file, the first audio file, the data files, and the message files.

The present invention provides a computer program product, comprising a computer readable storage medium having a computer readable program code embodied therein, the computer readable program code comprising an algorithm that when executed by a computer processor of a computing system implements a method comprising: receiving, by the computer processor, a first video file and a first audio file associated with the first video file; receiving, by the computer processor, data files associated with the first audio file and the first video file; receiving, by the computer processor, message files associated with the data files; storing, by the computer processor, the first video file in a first layer of a multimedia file, the first audio file in a second layer of the multimedia file, the data files in first additional layers of the multimedia file, and the message files in second additional layers of the multimedia file; and storing, by the computer processor on a computer readable storage medium, the multimedia file comprising the first video file, the first audio file, the data files, and the message files.

The present invention provides a computing system comprising a computer processor coupled to a computer-readable memory unit, the memory unit comprising instructions that when executed by the computer processor implements a method comprising: receiving, by the computer processor, a first video file and a first audio file associated with the first video file; receiving, by the computer processor, data files associated with the first audio file and the first video file; receiving, by the computer processor, message files associated with the data files; storing, by the computer processor, the first video file in a first layer of a multimedia file, the first audio file in a second layer of the multimedia file, the data files in first additional layers of the multimedia file, and the message files in second additional layers of the multimedia file; and storing, by the computer processor on a computer readable storage medium, the multimedia file comprising the first video file, the first audio file, the data files, and the message files.

The present invention advantageously provides a simple method and associated system capable of sharing information.

DETAILED DESCRIPTION

Figure 1:
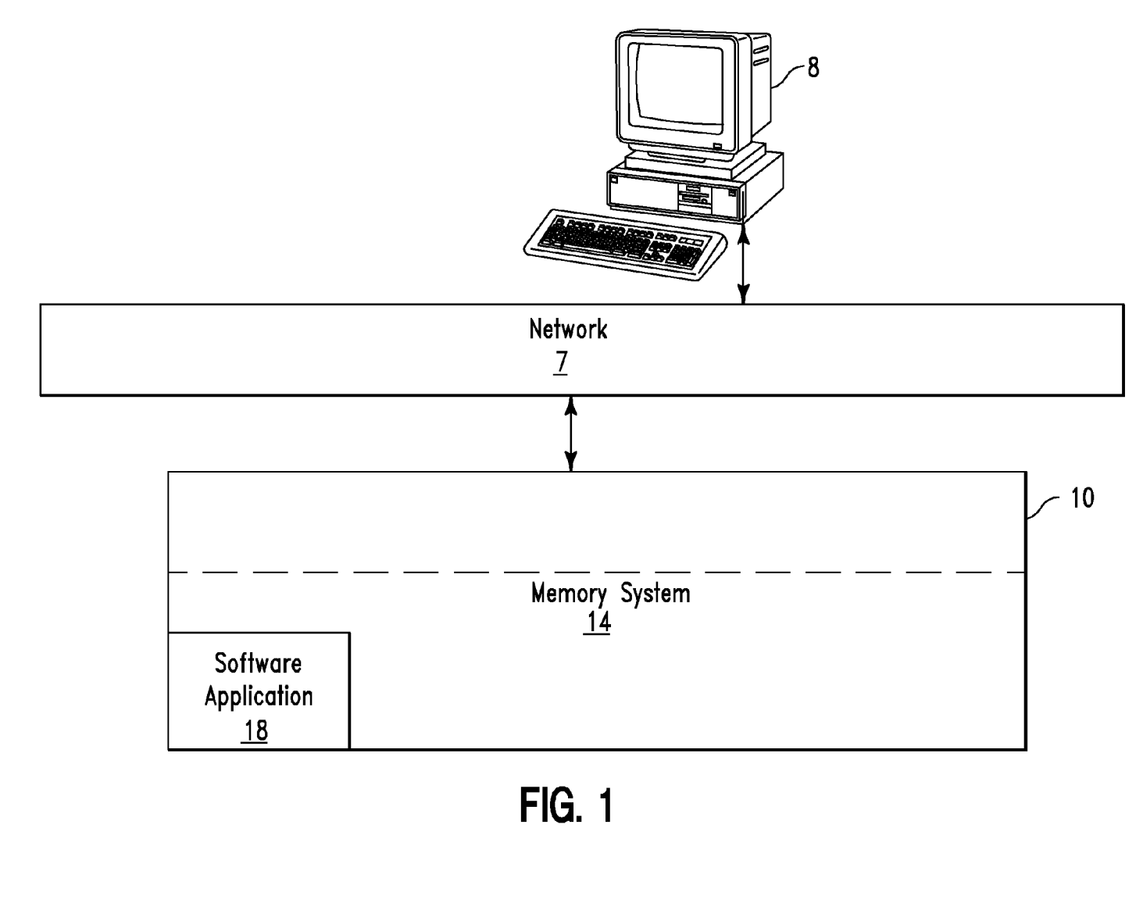
FIG. 1 illustrates a system for saving audio/video data and associated informational data files in multiple layers of a storage medium, in accordance with embodiments of the present invention.

FIG. 1 illustrates a system 5 for saving audio/video data and associated informational data files in multiple layers of a storage medium, in accordance with embodiments of the present invention. System 5 enables a user to generate an audio/video file format comprising associated informational data files stored in a multimedia layer (of a multimedia file) differing from a multimedia layer storing audio/video data (i.e., multimedia layer described with respect to FIG. 3, infra). The multimedia file comprises a constellation of different data objects. System 5 groups audio/video data, informational data files, and message files together into a single multimedia file. The informational data files and message files are stored in the multimedia file in different layers. The layers are segmented by user profiles associated with users. The informational data files and message files are stored in associated layers according to the user profiles. The informational data files and message files are not presented to the users during a presentation of the audio/video data. The informational data files and message files are presented to the users via external wireless in accordance with user profiles.

System 5 of FIG. 1 comprises a computing device 8 connected through a network 7 to a computing system 10. Device 8 may comprise any type of computing device such as, inter alia, a computer, a PDA, a laptop computer, a tablet computer, a cellular telephone, etc. Network 7 may comprise any type of network including, inter alia, a telephone network, a local area network, (LAN), a wide area network (WAN), the Internet, a wireless network, etc. Computing system 10 may comprise any type of computing system(s) including, inter alia, a computer (PC), a server computer, a database computer, a controller, etc. Computing system 10 comprises a memory system 14. Memory system 14 may comprise a single memory system. Alternatively, memory system 14 may comprise a plurality of memory systems. Memory system 14 comprises a software application 18.

Figure 2:
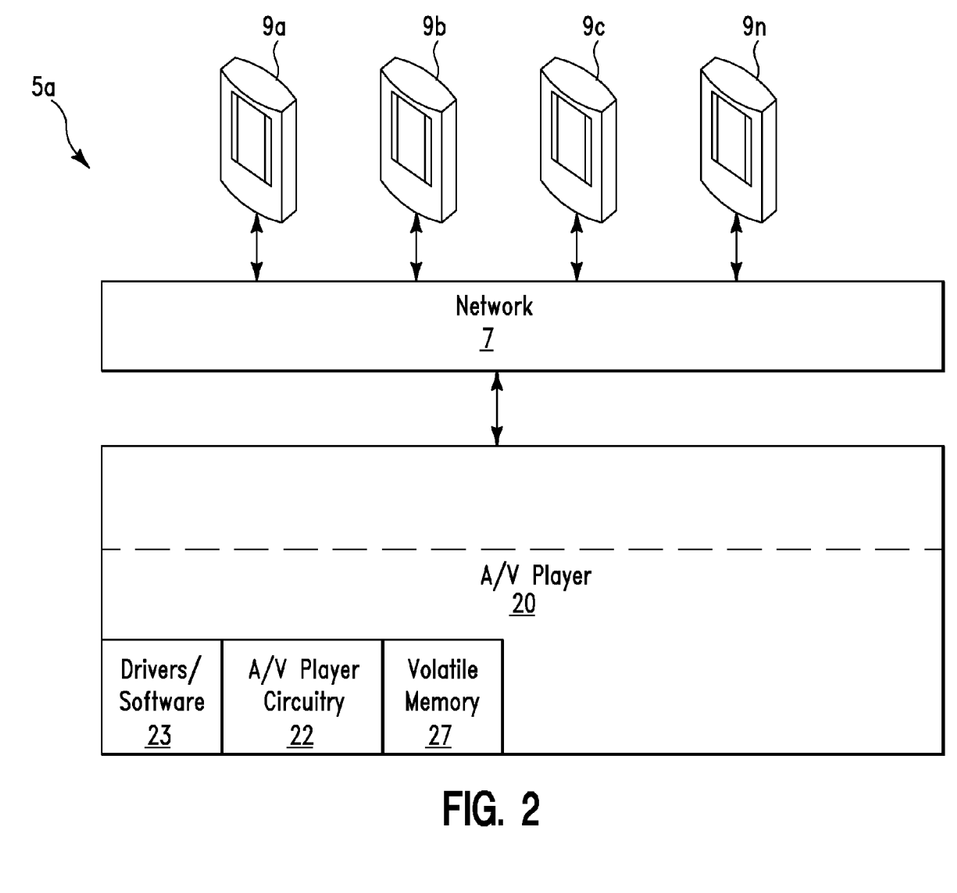
FIG. 2 illustrates a system 5 for presenting informational and message data associated with audio/video data, in accordance with embodiments of the present invention.

FIG. 2 illustrates a system 5a for presenting informational and message data associated with audio/video data, in accordance with embodiments of the present invention. The informational and message data presented by system 5a in generated by system 5 of FIG. 1 as described, infra. System 5a allows audiences (users) being presented with audio/video data (e.g., an audience watching a movie in a theater) to be notified (e.g., via a mobile wireless device such as, inter alia, a cellular telephone, a PDA, a laptop computer, etc) that associated informational and message data (i.e., stored with the audio/video data and on a different layer of the multimedia file) is available. The users are notified based on predefined terms determined by user profiles. The users are given (i.e., via the wireless devices) instructions as how to retrieve the associated informational and message data. For example, while watching a movie users are notified (via each user's wireless device) that information data (e.g., reference documents, a web link for the movie, ringtone data associated with the movie, etc) is available. The informational data is retrieved and presented to the users via the wireless devices based on user profiles. Additionally, the users may be presented with (via each users wireless device) message data comprising instructions for retrieving the information data.

System 5 of FIG. 1 comprises wireless devices 9a . . . 9n connected through a network 7 to an audio/video presentation device 20 (e.g., a digital video disc (DVD) player). Wireless devices 9a . . . 9n may comprise any type of wireless device such as, inter alia, a computer, a PDA, a laptop computer, a tablet computer, a cellular telephone, etc. Network 7 may comprise any type of network including, inter alia, a telephone network, a local area network, (LAN), a wide area network (WAN), the Internet, a wireless network, etc. Audio/video presentation device 20 may comprise any type of audio/video presentation device 20 including, inter alia, a DVD player, a compact disc player, a movie projector, a television, a music system, a computer, etc. Audio/video presentation device 20 comprises drivers/software 23, audio/video player circuitry 22, and a volatile memory device 27.

Drivers/software 23 enables the following process with respect to presenting informational and message data associated with audio/video data:

1. A multimedia file comprising audio/video data and associated informational and message data is enabled (e.g., via audio/video player 20).
2. The audio/video data is broadcasted for a plurality of users.
3. Audio/video player 20 (i.e., during the broadcast) identifies wireless devices 9a . . . 9n (e.g., mobile phones) belonging to the users (e.g., via Bluetooth technology, infrared technology, etc).
4. Audio/video player 20 retrieves user profiles (for the users) from wireless devices 9a . . . 9n. Based on each identified user profile, associated informational and message data files are retrieved from volatile memory device and transmitted to associated wireless devices 9a . . . 9n. The informational and message data files are retrieved from volatile memory device 27. Additionally, each user may request specific detail informational data (e.g., upon receiving a message, the user may select a specific portion of the detail information). In this case, each user may provide specific commands and specific detail information is retrieved from volatile memory device 27. Therefore, based on logic defined in the a related information layer of the multimedia file, audio/video player 20 locates and retrieves associated related informational files (e.g., a text file, an audio file, an image file, etc) based on user profiles and/or user selections and transmits the associated related informational files to associated wireless devices 9a . . . 9n.
5. After the broadcast has completed, volatile memory device 27 is cleared (i.e., all files are deleted from volatile memory device 27).

The following example 1 describes an implementation example for presenting informational and message data associated with audio/video data:

EXAMPLE 1

During an audio/video broadcast, a vacation destination is being broadcasted for an audience. A multimedia file comprising audio/video data for the broadcast additionally comprises two types of related details data files (e.g., audio, video, pdf, etc) stored in two different layers of the multimedia file. A first related details data file is associated with user profiles for users that like to travel. A second related details data file is associated with user profiles for users that like different types of foods. Based on the user profiles for members of the audience, each member is presented with (i.e., via an associated wireless device) the first related details data file or the second related details data file. Therefore there may be N numbers of user profile based information that may be stored in the multimedia file.

Figure 3:
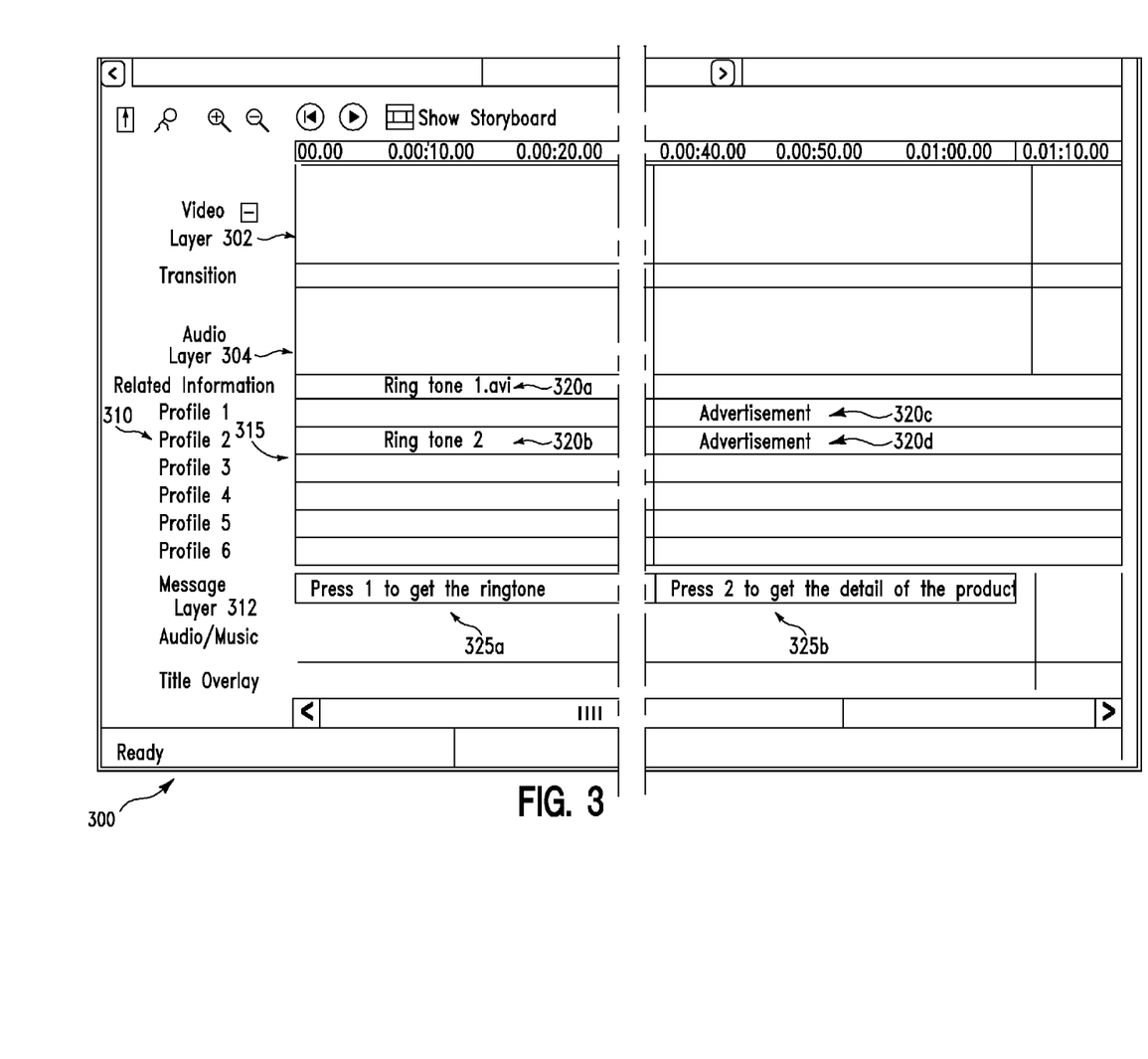
FIG. 3 illustrates a graphical user interface for saving and presenting informational and message data associated with audio/video data.

FIG. 3 illustrates a graphical user interface (GUI) 300 for saving and presenting informational and message data associated with audio/video data. GUI 300 is displayed via computing device 8 (for saving informational and message data in a multilayer multimedia file) or wireless devices 9a . . . 9n (for presenting and retrieving informational and message data from a multilayer multimedia file). GUI 300 comprises a video layer 302 (comprising video data for presentation), an audio layer 304 (comprising audio data for presentation), related information layers 315 (comprising informational data 320a . . . 320d for presentation to an audience via wireless devices 9a . . . 9n), message layer 312 (comprising messages 325a and 325b for presentation to an audience via wireless devices 9a . . . 9n), and associated user profiles 310 (i.e., for selecting informational data 320a . . . 320d and messages 325a and 325b). The example informational data 320a . . . 320d illustrated in FIG. 3 comprises ring tone files and advertisement files associated with video data from video layer 302 and/or audio data from audio layer 304. The example messages 325a and 325b illustrated in FIG. 3 comprises instructions for retrieving ring tone files or the advertisement files.

Figure 4:
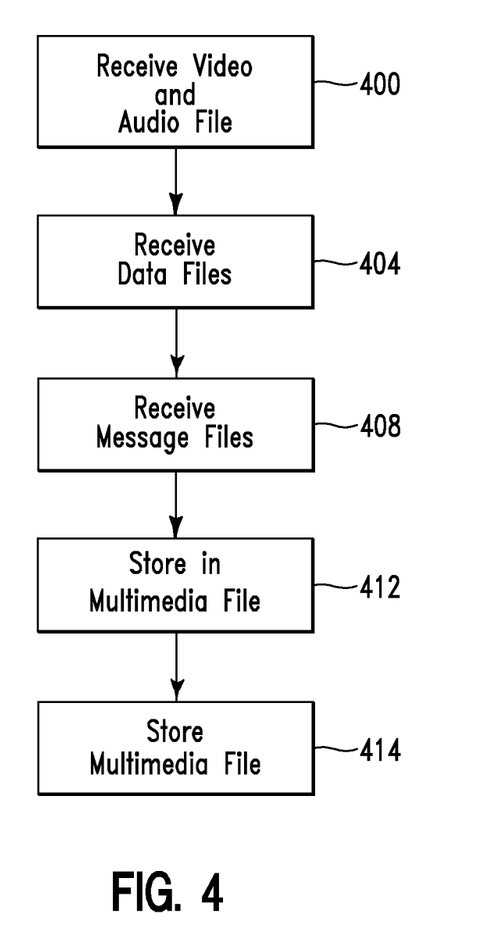
FIG. 4 illustrates an algorithm used by the system of FIG. 1 for implementing a process for saving audio/video data and associated informational data files in multiple layers of a storage medium, in accordance with embodiments of the present invention.

FIG. 4 illustrates an algorithm used by system 5 of FIG. 1 for implementing a process for saving audio/video data and associated informational data files in multiple layers of a storage medium, in accordance with embodiments of the present invention. In step 400, a computer processor (i.e., of a computing system such as, inter alia, computing system 10 of FIG. 1) receives a video file and an audio file associated with the video file. In step 404, the computer processor receives data files associated with the audio file and the video file. In step 408, the computer processor receives message files associated with the data files. In step 412, the computer processor stores the video file in a first layer of a multimedia file, the audio file in a second layer of the multimedia file, the data files in first additional layers of the multimedia file, and the message files in second additional layers of the multimedia file. In step 414, the computer processor stores (on a computer readable storage medium) the multimedia file comprising the video file, the audio file, the data files, and the message files. Additionally, the computer processor may generate a GUI (e.g., as illustrated in FIG. 3) and present (via the GUI) information describing the video file in the first layer, the audio file in the second layer, the data files in the first additional layers, and the message files in the second additional layers.

Figure 5:
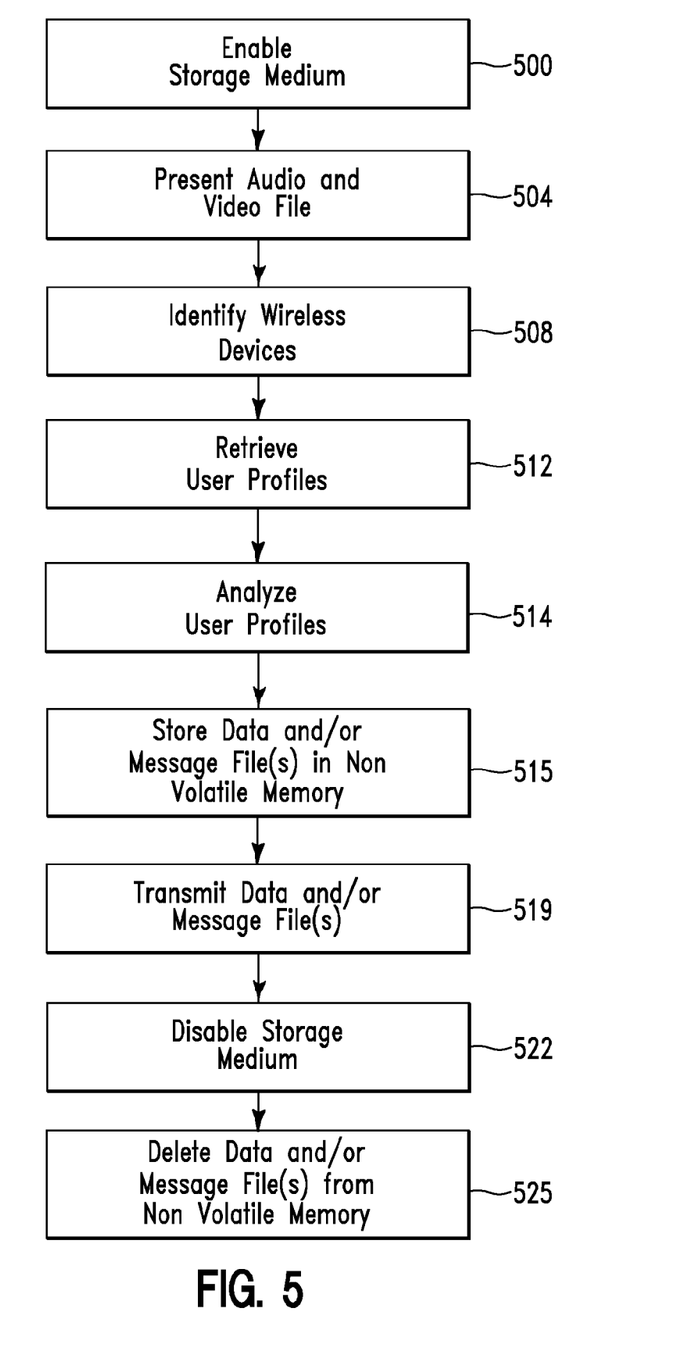
FIG. 5 illustrates an algorithm used by the system of FIG. 2 for implementing a process for presenting the informational and message data generated using the algorithm of FIG. 3, in accordance with embodiments of the present invention.

FIG. 5 illustrates an algorithm used by system 5a of FIG. 2 for implementing a process for presenting the informational and message data generated using the algorithm of FIG. 3, in accordance with embodiments of the present invention. In step 500, a computer processor (i.e., of an audio/video player such as, inter alia, audio/video player 20 of FIG. 2) enables a computer readable storage medium (e.g., a DVD). In step 504, the computer processor presents (to a plurality of users in response to the enabling) the video file synchronized with the audio file. In step 508, the computer processor identifies a plurality of wireless devices belonging to the plurality of users. In step 512, the computer processor retrieves (from the plurality of wireless devices) user profiles associated with the plurality of users). In step 514, the computer processor analyzes each user profile. In step 514, the computer processor stores (in a volatile memory device of the audio video player) and retrieves the data and/or messages files. In step 519, the computer processor transmits (i.e., to a first user or group of users via a first wireless device or group of wireless devices) in response to the analysis of step 514, a first data file or data files and or message files. In step 522, the computer processor disables the computer readable storage medium. In step 525, the computer processor removes (in response to step 522) the data files from the volatile memory device.

Figure 6:
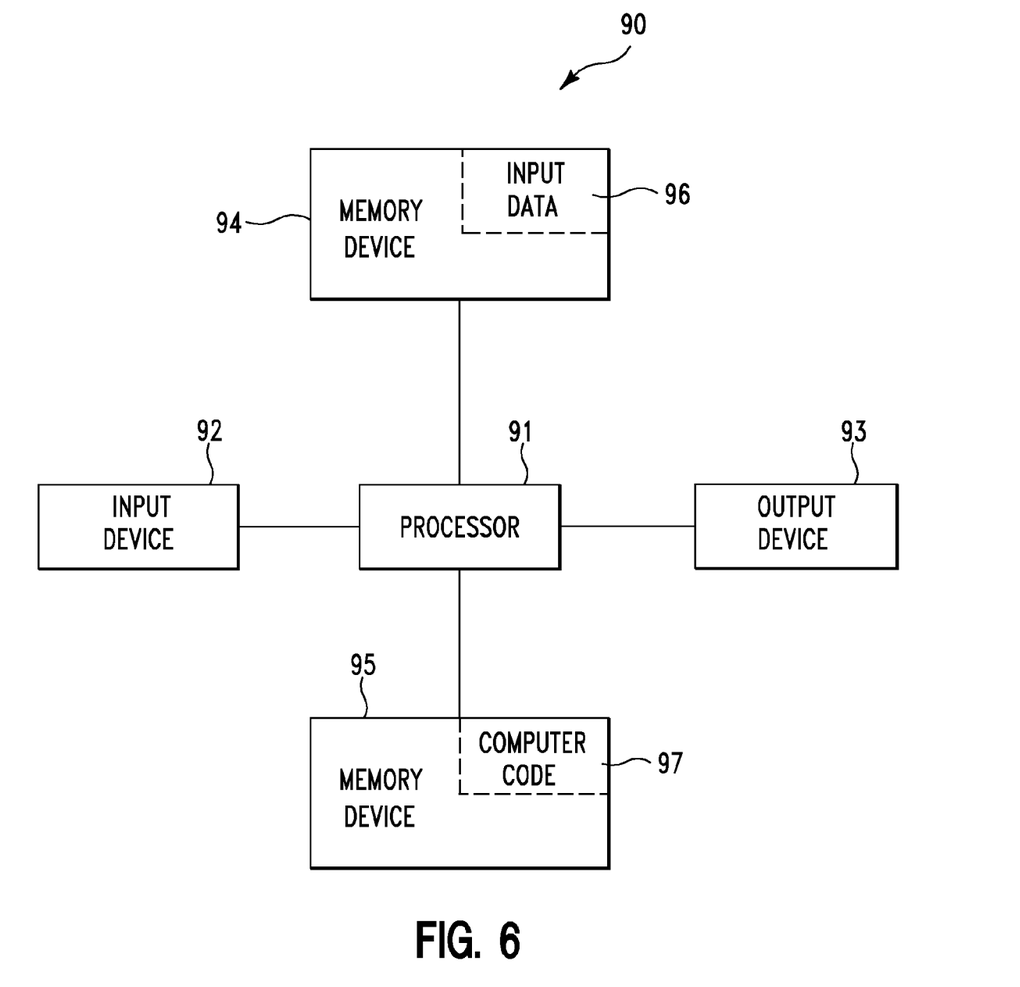
FIG. 6 illustrates a computer apparatus used for saving and presenting informational and message data files in/from multiple layers of a multimedia file, in accordance with embodiments of the present invention.

FIG. 6 illustrates a computer apparatus 90 (e.g., computing system 10 of FIG. 1 and/or audio/video player 20 of FIG. 2) used for saving and presenting informational and message data files in/from multiple layers of a multimedia file, in accordance with embodiments of the present invention. The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a software application, a mouse, etc. The output device 93 may be, inter alia, a printer, a plotter, a computer screen, a magnetic tape, a removable hard disk, a floppy disk, a software application, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithms of FIGS. 4 and 5) for saving and presenting informational and message data files in/from multiple layers of a multimedia file. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 6) may comprise the algorithms of FIGS. 4 and 5 and may be used as a computer usable medium (or a computer readable medium or a program storage device) having a computer readable program code embodied therein and/or having other data stored therein, wherein the computer readable program code comprises the computer code 97. Generally, a computer program product (or, alternatively, an article of manufacture) of the computer system 90 may comprise the computer usable medium (or said program storage device).

Still yet, any of the components of the present invention could be created, integrated, hosted, maintained, deployed, managed, serviced, etc. by a service provider who offers to for save and present informational and message data files in/from multiple layers of a multimedia file. Thus the present invention discloses a process for deploying, creating, integrating, hosting, maintaining, and/or integrating computing infrastructure, comprising integrating computer-readable code into the computer system 90, wherein the code in combination with the computer system 90 is capable of performing a method for saving and presenting informational and message data files in/from multiple layers of a multimedia file. In another embodiment, the invention provides a method that performs the process steps of the invention on a subscription, advertising, and/or fee basis. That is, a service provider, such as a Solution Integrator, could offer to save and present informational and message data files in/from multiple layers of a multimedia file. In this case, the service provider can create, maintain, support, etc. a computer infrastructure that performs the process steps of the invention for one or more customers. In return, the service provider can receive payment from the customer(s) under a subscription and/or fee agreement and/or the service provider can receive payment from the sale of advertising content to one or more third parties.

While FIG. 6 shows the computer system 90 as a particular configuration of hardware and software, any configuration of hardware and software, as would be known to a person of ordinary skill in the art, may be utilized for the purposes stated supra in conjunction with the particular computer system 90 of FIG. 6. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

The invention claimed is:
1. A method comprising:
receiving, by a computer processor of a computing system, a first video file and a first audio file associated with said first video file;
receiving, by said computer processor, data files associated with said first audio file and said first video file;
receiving, by said computer processor, message files associated with said data files;
enabling, by said computer processor, said first video file, said first audio file, said data files, and said message files;
segmenting, by said computer processor, said multimedia file into a plurality of discrete segmented layers;
storing, by said computer processor in response to said segmenting, said first video file in a first layer of a multimedia file, said first audio file in a second layer of said multimedia file, said data files in first additional layers of said multimedia file, and said message files in second additional layers of said multimedia file, wherein said first layer is configured to store only video files, wherein said second layer is configured to store only audio files, wherein said first additional layers are configured to store only data files, and wherein said second additional layers are configured to store only message files;

storing, by said computer processor on a computer readable storage medium, said multimedia file comprising said first video file, said first audio file, said data files, and said message files;

generating, by said computer processor, a graphical user interface (GUI) associated with illustrating contents of said multimedia file;

presenting, by said computer processor to a user via said GUI, information describing said first video file in said first layer, said first audio file in said second layer, said data files in said first additional layers, and said message files in said second additional layers;

identifying, by said computer processor, a wireless device belonging to said user, said wireless device differing from an audio/video presentation device configured to present said first video file synchronized with said first audio file; and transmitting, by said computer processor to the user via the wireless device, a data file of said data files and a message file of said message files, wherein said wireless device presents said data file and said message file to said user.

2. The method of claim 1, further comprising:
enabling, by said computer processor, said computer readable storage medium;
presenting, by said computer processor to a plurality of users in response to said enabling, said first video file synchronized with said first audio file;
identifying, by said computer processor, a plurality of wireless devices belonging to said plurality of users;
retrieving, by said computer processor from said plurality of wireless devices, user profiles associated with said plurality of users;
analyzing, by said computer processor, each user profile of said user profiles; and
transmitting, by said computer processor to a first user of said plurality of users via a first wireless device of said plurality of wireless devices in response to said analyzing, a first data file of said data files, wherein said first data file is associated with said first user profile of said user profiles associated with said first user, and wherein said first wireless device presents said first data file to said first user.

3. The method of claim 2, further comprising:
before said presenting, storing by said computer processor in an associated volatile memory device, said data files; and
before said transmitting, retrieving by said computer processor from said associated volatile memory device, said data files, wherein said first data file is retrieved from said associated volatile memory device prior to performing said transmitting.

4. The method of claim 3, further comprising:
after said transmitting, disabling by said computer processor, said computer readable storage medium; and
removing, by said computer processor in response to said disabling, said data files from said associated volatile memory device.

5. The method of claim 2, further comprising:
transmitting, by said computer processor to a second user of said plurality of users via a second wireless device of said plurality of wireless devices in response to said analyzing, a second data file of said data files, wherein said second data file is associated with a second user profile of said user profiles associated with said second user, wherein said second wireless device presents said second data file to said second user, and wherein said second data file differs from said first data file.

6. The method of claim 1, further comprising:
enabling, by said computer processor, said computer readable storage medium;
presenting, by said computer processor to a plurality of users in response to said enabling, said first video file synchronized with said first audio file;
identifying, by said computer processor, a plurality of wireless devices belonging to said plurality of users;
retrieving, by said computer processor from said plurality of wireless devices, user profiles associated with said plurality of users;
analyzing, by said computer processor, each user profile of said user profiles;
transmitting, by said computer processor to a first user of said plurality of users via a first wireless device of said plurality of wireless devices in response to said analyzing, a first message file of said message files, wherein said first message file is associated with a first user profile of said user profiles associated with said first user, wherein said first message file is associated with a first data file of said data files, and wherein said first wireless device presents said first message file to said first user;
receiving, by said computer processor from said first user, a first command for retrieving said first data file from said computer readable storage medium; and
transmitting, by said computer processor to said first user in response to said first command, said first data file, wherein said first wireless device presents said first data file to said first user.

7. The method of claim 6, further comprising:
before said presenting, storing by said computer processor in an associated volatile memory device, said data files; and
before said transmitting, retrieving by said computer processor from said associated volatile memory device, said data files, wherein said first data file is retrieved from said associated volatile memory device prior to performing said transmitting.

8. The method of claim 7, further comprising:
after said transmitting, disabling by said computer processor, said computer readable storage medium; and
removing, by said computer processor in response to said disabling, said data files from said associated volatile memory device.

9. The method of claim 6, further comprising:
transmitting, by said computer processor to second user of said plurality of users via a second wireless device of said plurality of wireless devices in response to said analyzing, a second message file of said message files, wherein said second message file is associated with a second user profile of said user profiles associated with said second user, wherein said second message file is associated with a second data file of said data files, wherein said second wireless device presents said second message file to said second user, wherein said second message file differs from said first message file, and wherein said second data file differs from said first data file;
receiving, by said computer processor from said second user, a second command for retrieving said second data file from said computer readable storage medium; and
transmitting, by said computer processor to said second user in response to said second command, said second data file, wherein said first wireless device presents said second data file to said second user.

10. The method of claim 1, wherein said storing said data files in said first additional layers of said multimedia file is based on predefined user profiles.

11. The method of claim 1, wherein said data files comprise files selected from the group consisting of a text file, a PDF file, an image file, a document file, an audio file, a video file, an advertisement file, and a Webpage associated file.

12. The method of claim 1, further comprising providing at least one support service for at least one of creating, integrating, hosting, maintaining, and deploying computer-readable code in said computing system, wherein the code in combination with the computing system is capable of performing the method of claim 1.

13. A computer program product, comprising a computer readable storage medium having device storing a computer readable program code embodied therein, said computer readable program code comprising an algorithm that when executed by a computer processor of a computing system implements a method comprising:
 receiving, by said computer processor, a first video file and a first audio file associated with said first video file;
 receiving, by said computer processor, data files associated with said first audio file and said first video file;
 receiving, by said computer processor, message files associated with said data files;
 enabling, by said computer processor, said first video file, said first audio file, said data files, and said message files;
 segmenting, by said computer processor, said multimedia file into a plurality of discrete segmented layers;
 storing, by said computer processor in response to said segmenting, said first video file in a first layer of a multimedia file, said first audio file in a second layer of said multimedia file, said data files in first additional layers of said multimedia file, and said message files in second additional layers of said multimedia file, wherein said first layer is configured to store only video files, wherein said second layer is configured to store only audio files, wherein said first additional layers are configured to store only data files, and wherein said second additional layers are configured to store only message files;
 storing, by said computer processor on a computer readable storage medium, said multimedia file comprising said first video file, said first audio file, said data files, and said message files;
 generating, by said computer processor, a graphical user interface (GUI) associated with illustrating contents of said multimedia file;
 presenting, by said computer processor to a user via said GUI, information describing said first video file in said first layer, said first audio file in said second layer, said data files in said first additional layers, and said message files in said second additional layers;
 identifying, by said computer processor, a wireless device belonging to said user, said wireless device differing from an audio/video presentation device configured to present said first video file synchronized with said first audio file; and
 transmitting, by said computer processor to the user via the wireless device, a data file of said data files and a message file of said message files, wherein said wireless device presents said data file and said message file to said user.

14. The computer program product of claim 13, wherein said method further comprises:
 enabling, by said computer processor, said computer readable storage medium;
 presenting, by said computer processor to a plurality of users in response to said enabling, said first video file synchronized with said first audio file;
 identifying, by said computer processor, a plurality of wireless devices belonging to said plurality of users;
 retrieving, by said computer processor from said plurality of wireless devices, user profiles associated with said plurality of users;
 analyzing, by said computer processor, each user profile of said user profiles; and
 transmitting, by said computer processor to a first user of said plurality of users via a first wireless device of said plurality of wireless devices in response to said analyzing, a first data file of said data files, wherein said first data file is associated with a first user profile of said user profiles associated with said first user, and wherein said first wireless device presents said first data file to said first user.

15. The computer program product of claim 14, wherein said method further comprises:
 before said presenting, storing by said computer processor in an associated volatile memory device, said data files; and
 before said transmitting, retrieving by said computer processor from said associated volatile memory device, said data files, wherein said first data file is retrieved from said associated volatile memory device prior to performing said transmitting.

16. The computer program product of claim 15, wherein said method further comprises:
 after said transmitting, disabling by said computer processor, said computer readable storage medium; and
 removing, by said computer processor in response to said disabling, said data files from said associated volatile memory device.

17. The computer program product of claim 14, wherein said method further comprises:
 transmitting, by said computer processor to a second user of said plurality of users via a second wireless device of said plurality of wireless devices in response to said analyzing, a second data file of said data files, wherein said second data file is associated with a second user profile of said user profiles associated with said second user, wherein said second wireless device presents said second data file to said second user, and wherein said second data file differs from said first data file.

18. The computer program product of claim 13, wherein said method further comprises:
 enabling, by said computer processor, said computer readable storage medium;
 presenting, by said computer processor to a plurality of users in response to said enabling, said first video file synchronized with said first audio file;
 identifying, by said computer processor, a plurality of wireless devices belonging to said plurality of users;
 retrieving, by said computer processor from said plurality of wireless devices, user profiles associated with said plurality of users;
 analyzing, by said computer processor, each user profile of said user profiles;
 transmitting, by said computer processor to a first user of said plurality of users via a first wireless device of said plurality of wireless devices in response to said analyzing, a first message file of said message files, wherein said first message file is associated with a first user profile of said user profiles associated with said first user, wherein said first message file is associated with a first data file of said data files, and wherein said first wireless device presents said first message file to said first user;

receiving, by said computer processor from said first user, a first command for retrieving said first data file from said computer readable storage medium; and transmitting, by said computer processor to said first user in response to said first command, said first data file, wherein said first wireless device presents said first data file to said first user.

19. A computing system comprising a computer processor coupled to a computer-readable memory unit, said memory unit comprising instructions that when executed by the computer processor implements a method comprising:

receiving, by said computer processor, a first video file and a first audio file associated with said first video file;

receiving, by said computer processor, data files associated with said first audio file and said first video file;

receiving, by said computer processor, message files associated with said data files;

enabling, by said computer processor, said first video file, said first audio file, said data files, and said message files;

segmenting, by said computer processor, said multimedia file into a plurality of discrete segmented layers;

storing, by said computer processor in response to said segmenting, said first video file in a first layer of a multimedia file, said first audio file in a second layer of said multimedia file, said data files in first additional layers of said multimedia file, and said message files in second additional layers of said multimedia file, wherein said first layer is configured to store only video files, wherein said second layer is configured to store only audio files, wherein said first additional layers are configured to store only data files, and wherein said second additional layers are configured to store only message files;

storing, by said computer processor on a computer readable storage medium, said multimedia file comprising said first video file, said first audio file, said data files, and said message files;

generating, by said computer processor, a graphical user interface (GUI) associated with illustrating contents of said multimedia file;

presenting, by said computer processor to a user via said GUI, information describing said first video file in said first layer, said first audio file in said second layer, said data files in said first additional layers, and said message files in said second additional layers;

identifying, by said computer processor, a wireless device belonging to said user, said wireless device differing from an audio/video presentation device configured to present said first video file synchronized with said first audio file; and transmitting, by said computer processor to the user via the wireless device, a data file of said data files and a message file of said message files, wherein said wireless device presents said data file and said message file to said user.

* * * * *